B. L. CUSHING & E. W. ERRICK.
HUMIDIFYING AND HUMIDITY REGULATING APPARATUS.
APPLICATION FILED JAN. 24, 1914.
1,160,695. Patented Nov. 16, 1915.
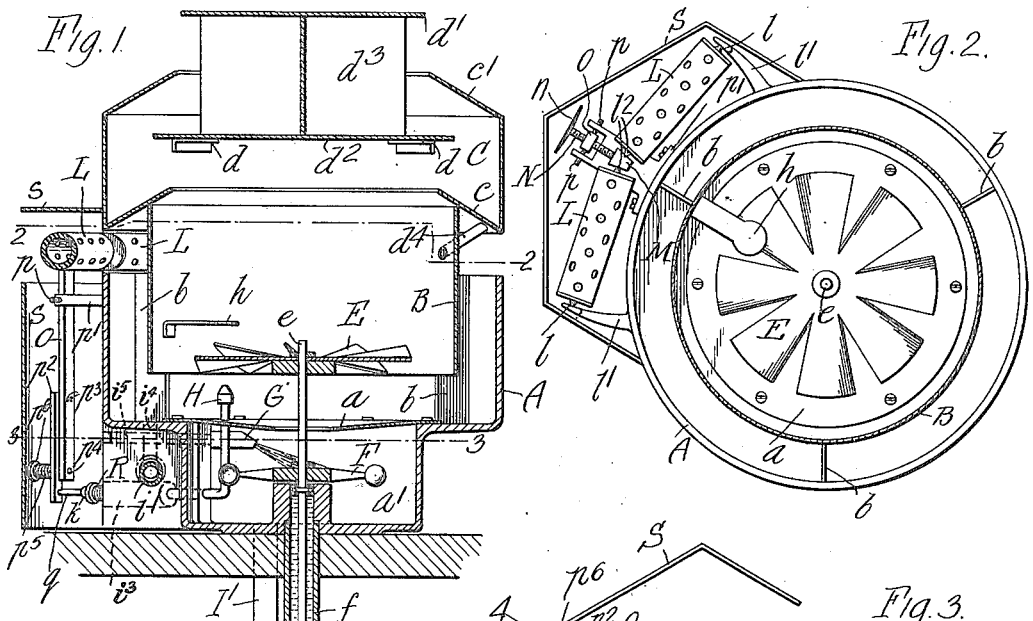
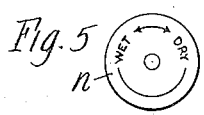
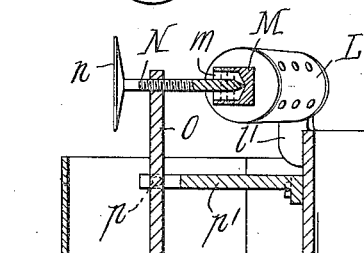
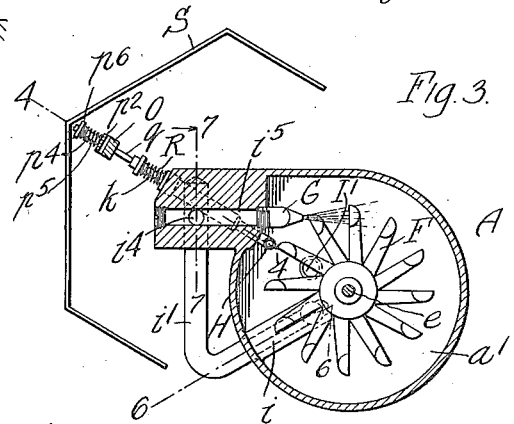
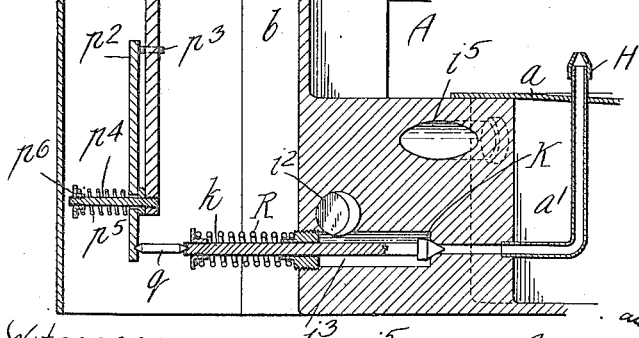
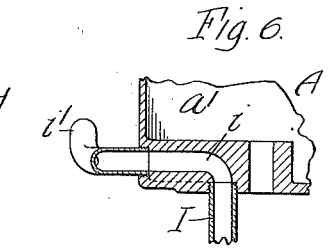
Witnesses.
A. G. Dimond.
A. L. McGee.
Inventors.
Bruce L. Cushing
Edward W. Errick
by Wilhelm & Parker
Attorneys.

UNITED STATES PATENT OFFICE.

BRUCE L. CUSHING AND EDWARD W. ERRICK, OF BUFFALO, NEW YORK.

HUMIDIFYING AND HUMIDITY-REGULATING APPARATUS.

1,160,695.            Specification of Letters Patent.      Patented Nov. 16, 1915.

Application filed January 24, 1914. Serial No. 814,187.

*To all whom it may concern:*

Be it known that we, BRUCE L. CUSHING and EDWARD W. ERRICK, citizens of the United States, residing at Buffalo, in the county of Erie and State of New York, have invented a new and useful Improvement in Humidifying and Humidity-Regulating Apparatus, of which the following is a specification.

This invention relates to apparatus or devices for humidifying or moistening air and automatically controlling the humidity thereof.

The objects of the invention are to produce an efficient and practical humidifying apparatus which will cause a circulation of air in a room or chamber and automatically control the humidity thereof as may be required; also to construct the device so that it can be made of small and compact form especially adapted for use in cigar cases and other small chambers in which it is desired to maintain a definite condition of humidity, and so that the humidity regulating device, while being of small and inexpensive construction is nevertheless accurate and reliable in action.

In the accompanying drawings: Figure 1 is a sectional elevation of an automatic humidifying and humidity controlling device embodying the invention. Fig. 2 is a plan view, partly in section, in line 2—2, Fig. 1, thereof. Fig. 3 is a sectional plan view thereof in line 3—3, Fig. 1. Fig. 4 is a sectional elevation on an enlarged scale, in line 4—4, Fig. 3. Fig. 5 is an end view of the adjusting device. Fig. 6 is a fragmentary section in line 6—6, Fig. 3. Fig. 7 is a fragmentary section in line 7—7, Fig. 3.

The humidifying device comprises a casing through which the air is circulated by a rotary fan, a water driven wheel or propeller for driving the fan, a nozzle by which water is discharged against the fan whereby it is atomized and distributed in a finely divided condition in the casing so as to humidify the air as it passes through the casing, and a humidity regulating device which is affected by the humidity of the air entering the casing and actuates a water supply valve to control the humidity of the air.

The casing comprises a lower portion or receptacle A which is open at the top, and a body portion or shell B, open at its upper and lower ends, which is supported with its open lower end extending downwardly into the open upper end of the receptacle A. The receptacle A preferably has a dished partition $a$ with a central opening forming a partially closed bottom chamber $a'$ for the propeller wheel. This propeller chamber, as shown, is of smaller diameter than the upper part of the receptacle. The shell B may be supported and retained in position in the receptacle A in any convenient way as, for instance, by vertical spacing plates or ribs $b$ which are secured to the cylindrical walls of the shell B and removably support the shell in the receptacle A. The shell B is preferably provided with an enlarged head portion C, the bottom and top walls $c$ $c'$ of which converge upwardly. Within the central opening of the head portion C of the shell is supported, as by arms $d$ on the head, a cap or deflector consisting of horizontal top and bottom plates $d'$ and $d^2$ connected by upright spacing plates $d^3$. The bottom plate $d^2$, which is located between the top and bottom walls of the head C, is of larger diameter than the central openings through the bottom and top walls of the head so that the air which flows upwardly through the casing is deflected and has to follow a tortuous course in leaving the casing, whereby more or less of the free particles of water carried by the air are intercepted and separated therefrom. The separated water collecting in the head C drains therefrom through a suitable pipe $d^4$ into the shell and finds its way back to the bottom chamber of the receptacle A.

E represents a horizontally rotating fan arranged in the casing, preferably near the lower end of the shell B, for causing a circulation of air through the casing, the air entering the casing between the lower end of the shell B and the receptacle A and passing out through the opening in the top of the head C. The fan is secured to a central vertical shaft $e$ and is preferably driven by a water wheel F which is located in the bottom chamber of the receptacle A and is secured to the fan shaft and against which a jet of water is discharged from a nozzle G. The fan shaft is preferably journaled in ball bearings at the upper and lower ends of a tubular downward extension $f$ of the receptacle A, this tubular extension serving as an oil receptacle for insuring proper lubrication of the shaft bearings.

H represents a nozzle which is arranged to discharge a jet of water against the rotating fan E whereby the water is atomized and distributed in a finely divided condition in the casing for humidifying the air passing through the casing. $h$ represents a baffle plate secured in the casing above the fan for the purpose of intercepting and breaking up any water from the nozzle which may pass through the blades of the fan. The water may be supplied to the propeller nozzle G and the humidifying nozzle H by suitable connections from the ordinary water service system or other source of water under pressure. Preferably a water supply pipe I extends up through the floor of the chamber in which the device is located and, as shown, connects with a passage $i$ in the bottom of the receptacle A, which passage in turn connects by a pipe $i'$ and passages $i^2$ $i^3$ $i^4$ $i^5$ with the propeller and humidifying nozzles G and H. The passages $i^2$ $i^3$ $i^4$ and $i^5$ are formed in a part of the casting which forms the receptacle A. I' is a waste or drain pipe leading from the bottom of the receptacle A.

The discharge of water from the humidifying nozzle is regulated by a valve K under the control of a humidity regulator or hygrostat which is affected by the humidity of the air entering the casing of the humidifier. The valve K shown is movable endwise in an enlargement of the water passage $i^3$ leading to the humidifying nozzle and has a projecting stem $k$. This humidity regulator is preferably constructed and connected to the valve K as follows:

L L represent two bodies of hygroscopic material which are preferably arranged adjacent to the space between the upper end of the receptacle A and the head C of the casing so as to be in the path of the air which enters the casing. These hygroscopic bodies preferably consist of perforated tubes of bass wood in which the grain runs crosswise of the tube. The air thus has access to the interior as well as to the exterior of the tubes and the tubes will expand or contract lengthwise, depending upon the amount of humidity in the air affecting the tubes. The tubes L L extend at an angle to each other and are provided at their outer ends with bearing points $l$ which rest in fixed bearing arms $l'$ projecting outwardly from the casing, and at their adjacent ends the tubes are provided with bearings $l^2$, preferably in the form of knife edges, which bear in suitable grooves in the opposite sides of a bearing block M arranged between the adjacent ends of the tubes. This bearing block M is provided with a socket $m$, Fig. 4, in which bears the pointed inner end of a screw or rod N which has an adjustable screw connection with the upper end of an actuating lever O for the water supply valve K. The adjustable screw N is preferably provided at its outer end with a head or dial $n$ for turning it to adjust the upper end of the lever inwardly or outwardly with reference to the bearing block M, and this head or dial is preferably provided on its face with suitable marks, such, for example, as the double headed arrow and the words "wet" and "dry," see Fig. 5, to indicate the direction for turning the screw to increase or decrease the humidity of the air. The lever O is suitably fulcrumed, by means of two cone screws $p$, or otherwise, to a bracket $p'$ projecting from the casing, and is provided at its lower end with a yielding arm or extension $p^2$ by which the movement of the lever is transmitted to the water supply valve K for actuating it. The arm $p^2$, as shown, bears at one end against two small screws $p^3$, Fig. 4, secured in the lever O, and is provided with a hole through which projects a stem or screw $p^4$ secured to the lever O. A spring $p^5$ surrounds this stem between the arm $p^2$ and an adjustable nut $p^6$ screwed on the outer end of the stem. This spring presses the arm $p^2$ inward toward the lever O but permits it to yield outwardly. The tension of the spring can be altered by adjusting the nut $p^6$ to regulate the pressure necessary to cause the arm to yield away from the lever. The free end of the arm $p^2$ of the lever bears against the outer end of a thrust pin $q$ which bears at its inner end against the outer end of the stem $k$ of the water supply valve K. The arm $p^2$ and valve stem are provided with suitable sockets in which the conical ends of the thrust pin are seated. The water supply valve is moved outwardly or opened by a spring R which preferably surrounds the valve stem between an adjustable nut screwed on the outer end of the stem and a guide plug or gland through which the stem passes. This spring exerts an outward pressure on the valve stem and thrust pin $q$, thus holding the pin in position and holding the adjusting screw N at the opposite end of the lever against the bearing block M.

The regulating device is preferably located inside of a protecting shield or guard S which, if desired, can be movably secured to the casing to afford access to the regulator. A plate s also projects from the casing above the hygroscopic tubes L L of the regulator and shields them from direct contact with the humidified air leaving the humidifier.

The operation of the humidity regulating device is as follows: If the humidity of the air increases, the hygroscopic tubes L will expand, and being arranged at an angle to each other, will move the bearing block M, the adjusting screw N and the upper end of the lever O outwardly so as to move the lower end of the lever inwardly and move the valve K to shut off or decrease the discharge of water through the humidifying nozzle H. On the other hand, if the humidity of the air affecting the hygroscopic tubes L decreases, the tubes will contract and the valve actuating spring R will move the valve outwardly or open it, this movement of the valve being permitted by the inward movement of the bearing block M which is allowed under this condition. By adjusting the screw N the hygroscopic tubes can be caused to operate to maintain a greater or less humidity of the air. The lever O actuates the valve through the medium of the yielding arm $p^2$ and in the event that the hygroscopic tubes continue to expand after the water supply valve K has been moved against its seat, the arm $p^2$ will yield and thus prevent injury to the apparatus. The spring $p^5$ for the yielding arm $p^2$ is adjusted so as to exert sufficient pressure to move the valve inwardly against the action of the valve opening spring R and firmly seat the valve but to permit the arm $p^2$ to yield before injury is done to the regulating device.

This regulating device while being of simple construction and small size, is sensitive and positive in action and insures a reliable and accurate regulation of the humidity of the air. The air circulating fan is continually in motion whether or not the humidifying nozzle is closed, thus always maintaining a circulation of air past the humidity regulating device.

We claim as our invention:

1. The combination of a humidifier casing, means for circulating air through said casing, means for supplying moisture to the air in said casing, said casing having a relatively long and narrow air inlet opening, a humidity regulating device having a controlling member arranged lengthwise of said air inlet opening in close proximity thereto, and means actuated by said device for controlling the supply of moisture to the air passing through the casing.

2. The combination of a humidifier casing, means for circulating air through said casing, means for spraying water in said casing, a humidity regulating device having a member subjected to the air entering the casing, a valve controlling the supply of water to said spray, and mechanical means connecting said valve and said regulating device and checking the flow of water to said casing when the humidity of the surrounding air exceeds a predetermined point.

3. The combination of a humidifier casing, means for circulating air through said casing, means for spraying water in said casing, a humidity regulating device having a member subjected to the air entering the casing, a lever to which said regulating device is connected, and a valve actuated by said lever for controlling the supply of water to be sprayed in said casing.

4. The combination with a casing having water supply and drain pipes, means for inducing a circulation of air through said casing, means for spraying water in said casing to humidify the air passing through the same, means for controlling the spraying of water in said casing, and a humidity regulating device which is connected with said controlling means and which is expanded and contracted by the action thereon of the humidity of the air entering said casing, the movement of the humidity regulating device being imparted to said regulating device by mechanical means mounted on said casing.

5. A humidity regulator comprising two rigid members which are affected by changes in the humidity of the air and are arranged to exert pressure in directions at an angle to each other when expanded by the action of the humidity of the air, a part which is located between said members and is moved thereby in a direction at an angle to the directions of application of said pressure, a lever on one arm of which said part acts, and humidifying means actuated by the other arm of said lever.

6. A humidity regulator comprising two rigid members which are affected by changes in the humidity of the air and are arranged to exert pressure in directions at an angle to each other when expanded by the action of the humidity of the air, a lever engaged by said members and adapted to be swung about its pivot by the expansion and contraction of said members, and humidifying means engaged by and actuated by said valve.

7. A humidity regulator comprising two wooden members which are arranged to expand in directions at an angle to each other with changes in the humidity of the air affecting said members, a part which is located between said members and against the opposite ends of which said members bear, said part being moved by the expansion of said members, and humidifying means actuated by said part.

8. A humidity regulator comprising two wooden members in which the grain extends transversely of the members and which are arranged to expand in directions at an angle to each other with changes in the humidity of the air affecting said members, a movable part against which the adjacent ends of said members bear and which is moved by the expansion of said members, a lever actuated by said part, and a humidifying valve actuated by said lever, a yielding connection being provided between said lever and said valve.

Witness our hands, this 14th day of January, 1914.

BRUCE L. CUSHING.
EDWARD W. ERRICK.

Witnesses:
WILLIAM P. CLOTHIER, Jr.,
FRANK H. SELLERS.